No. 12,846.

REISSUED AUG. 25, 1908.

C. W. BECK.

ACETYLENE GAS GENERATOR.

APPLICATION FILED NOV. 4, 1907.

2 SHEETS—SHEET 1.

WITNESSES

Juliette Fritz

C. H. Kaufmann

INVENTOR

Charles W. Beck

By Davis & Davis

ATTORNEYS

No. 12,846.

REISSUED AUG. 25, 1908.

C. W. BECK.

ACETYLENE GAS GENERATOR.

APPLICATION FILED NOV. 4, 1907.

2 SHEETS—SHEET 2.

WITNESSES

Juliusz Sutch

E. F. Kaufmann

INVENTOR

Charles W. Beck

BY

Davis & Davis

ATTORNEYS

UNITED STATES PATENT OFFICE.

CHARLES W. BECK, OF ROCKVILLE CENTER, NEW YORK, ASSIGNOR TO ELECTROLITE GAS LAMP COMPANY, OF NEW YORK, N. Y., A CORPORATION OF NEW YORK.

ACETYLENE-GAS GENERATOR.

No. 12,846. Specification of Reissued Letters Patent. Reissued Aug. 25, 1908.

Original application filed October 6, 1903, Serial No. 175,955. Renewed January 26, 1907, Serial No. 354,315. Original No. 867,001, dated September 24, 1907. Application for reissue filed November 4, 1907. Serial No. 400,701.

*To all whom it may concern:*

Be it known that I, CHARLES W. BECK, a citizen of the United States, residing in the town of Rockville Center, county of Nassau, State of New York, have invented certain new and useful Improvements in Acetylene-Gas Generators, of which the following is a specification, reference being had therein to the accompanying drawings, in which—

Figure 1:
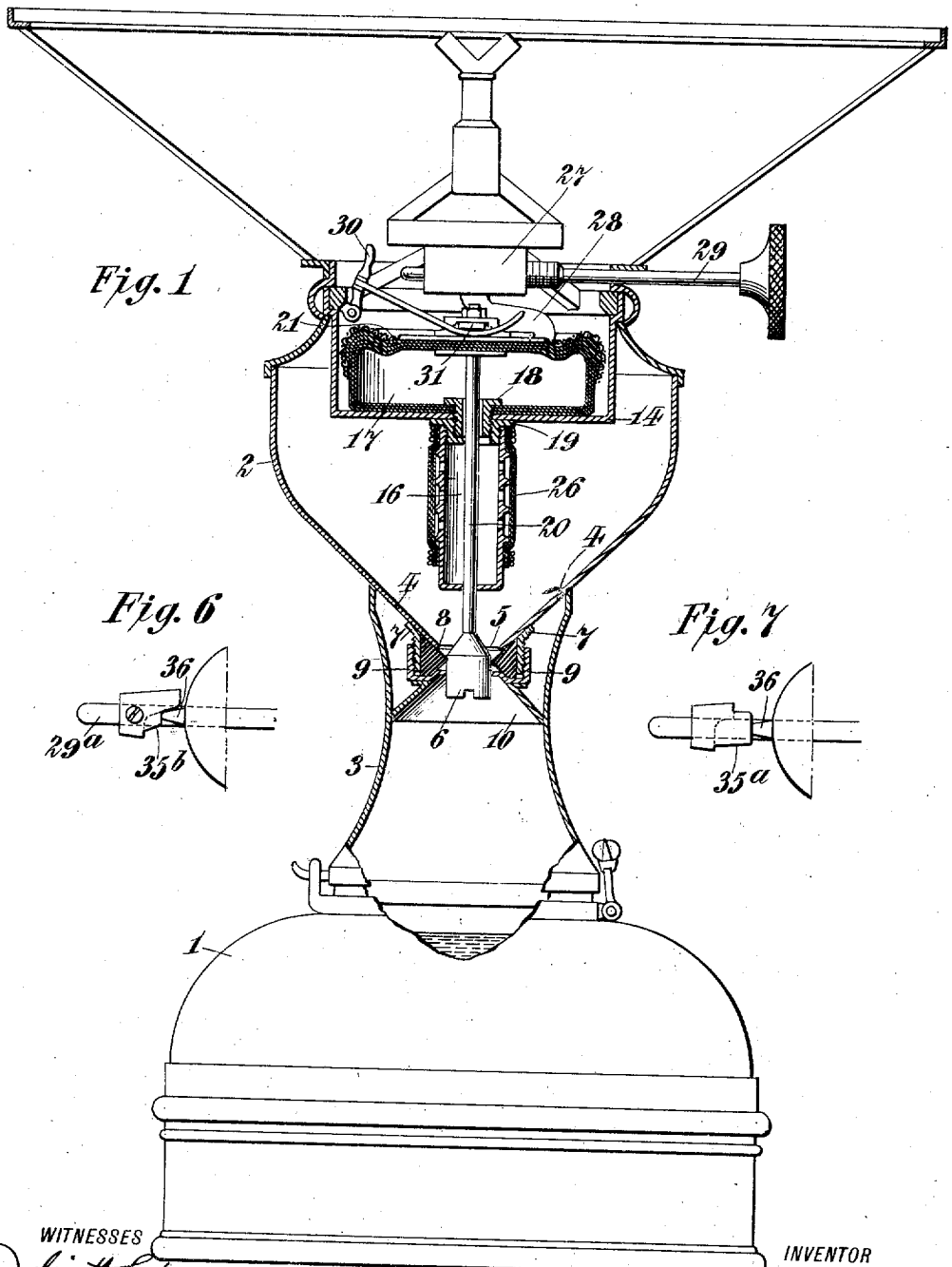
Figure 2:
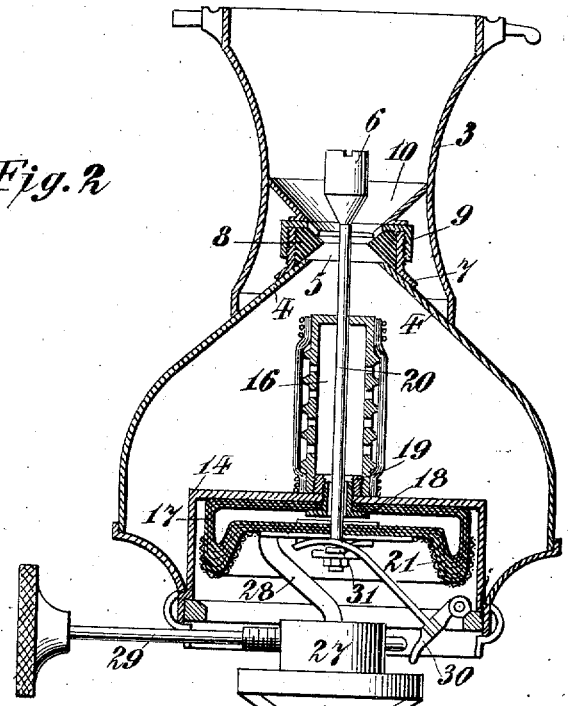
Figure 4:
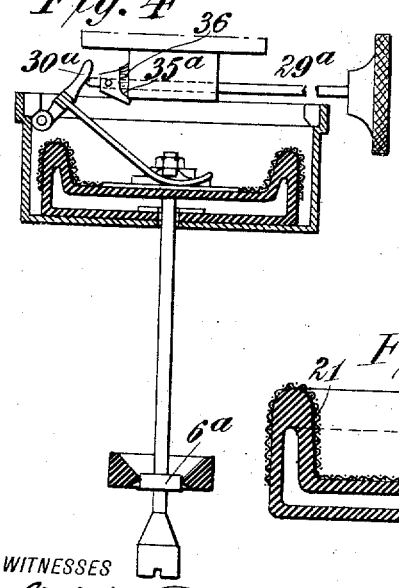
Figure 5:
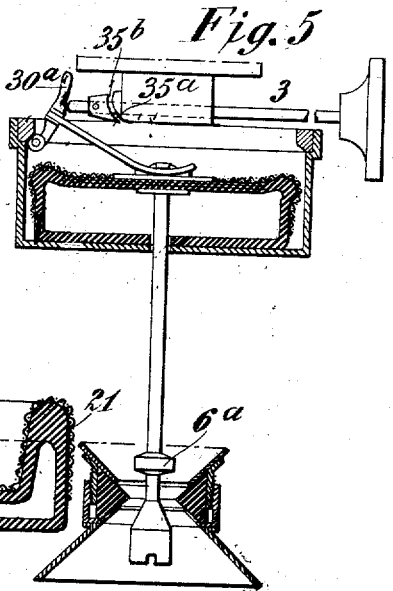
Figure 3:
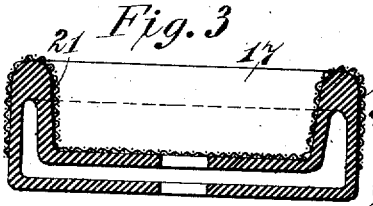

Figure 1 is a vertical sectional view of a generator in the form of a lamp; Fig. 2 a similar view of the carbid holder detached from the water holder and inverted; Fig. 3 a vertical sectional view of the self-collapsing gas holder; Fig. 4 a detail sectional view showing a different form of mechanism for operating the feed valve; Fig. 5 is a similar view showing the same mechanism in another position; and Figs. 6 and 7 detail plan views of the valve-operating cam in different positions.

One of the main objects of this invention is to provide a generator consisting of a lower water holder and an upper carbid holder, said holders being detachably connected together and so constructed that access can be had to the interiors thereof only when the parts are detached, whereby it will be necessary to separate the two parts in order to replenish the carbid or water supply it being necessary to invert the carbid holder before it can be charged. The carbid holder as shown in the drawings is so constructed, and is provided with a feed mechanism of such form, that when said holder is detached from the water holder it may be inverted and the carbid supplied thereto through the feed opening, whereby it will be possible to permanently seal the carbid holder except for the feed passage or opening at its lower end.

Another object of the invention is to provide a feed mechanism which when the carbid supply is exhausted will leave the feed passage open, so that when the carbid holder is detached and inverted it may be recharged through the feed passage, without the necessity of removing any parts or manually opening the feed valve.

Other and equally important objects and advantages of this invention will appear hereinafter.

Claims for the self-collapsing gas bag or holder shown and described herein have been embodied in my copending application filed March 4, 1907, Serial No. 360,332, for acetylene gas lamps.

Referring to the various parts by numerals, 1 designates the base or water holder of the generator, 2 the carbid holder, and 3 a central depending support secured to the carbid holder and adapted to be detachably connected to the top of the water holder, said support forming with the water holder a narrow gas generating chamber, and in the present instance serving as a standard like handle which may be grasped when it is desired to move the generator; and also as a measure by which the proper quantity of carbid to fill the holder may be accurately gaged.

The carbid receptacle or holder is substantially bowl-shaped and has its downwardly converging sides prolonged or extended inwardly beyond the junction with the upper edge of the chamber or support 3, as indicated at 4, to form a partition separating the carbid chamber from the gas space below. The lower end of said carbid holder terminates in a feed opening 5, through which is arranged to work a feed plunger 6, there being no communication between the water holder or generating chamber and the interior of the carbid holder except through said feed opening, and the generating chamber and the carbid holder being otherwise hermetically sealed, except for the gas outlet to the burner.

Mounted on the under side of the carbid holder, concentric with the feed aperture thereof, is a housing ring 7, which forms in conjunction with the under side of the said holder, a receptacle within which is mounted a flexible valve-ring 8, through which works the feed plunger. The inner margin of this ring is brought to a blunt edge to reduce the friction between it and the feed plunger. A cap 9 is threaded upon the housing ring, the lower end of said cap underlying and bearing upon the lower surface of the valve ring to clamp said ring in position and to compress it slightly to compensate for wear and to insure a gas and liquid tight joint between the feed plunger and said ring. The cap 9 is, of course, provided with a central aperture larger in diameter than the internal diameter of the valve ring, so that it will not interfere with the vertical reciprocation of the feed plunger. To the bottom of this cap is secured a downwardly enlarged funnel 10, the lower edge of which bears against the side wall of the chamber or support 3, and forming, with the lower portion of said chamber, when the carbid holder is removed from the water holder and inverted, a filling funnel and measure into which the carbid is poured when charging the carbid holder, as will be more fully hereinafter described.

Within the upper part of the carbid holder is secured the cup-shaped partition 14, having its upper edge secured within the top of the carbid holder, and forming a receptacle for the gas holder. This partition is provided with a central aperture, which opens into a tubular extension or housing 16, which extends downwardly to a point near the lower end of the carbid holder, said housing terminating far enough above the said opening to permit the carbid to flow readily through said feed opening.

Within the receptacle formed by the cup-shaped partition is arranged a flexible resilient self-collapsing gas holder, preferably a bag 17 formed of rubber. This bag is molded in its collapsed condition, as shown in Fig. 3, and consists preferably of two substantially cup shaped portions one of which fits within the other. The bottom wall of the inner cup, which wall forms the top of the holder when said holder is inflated, is preferably made thicker than the walls of the outer cup, these latter walls forming the bottom and lower part of the holder when the bag is inflated. At the point where the walls of the inner cup are joined to the upper edges of the outer cup the bag is considerably thickened. The object of this construction is to make the bag self-collapsing and to give to its walls such strength that considerable pressure from the interior will be required to expand it; and likewise to have the expanded bag tending strongly to collapse to thereby expel the gas and open the feed valve. By thickening the wall of the bag at the juncture of the vertical walls of the two cups a spring action is obtained of considerable strength to return the bag to its normal collapsed condition. This thickening of the walls of the bag at this point also greatly strengthens it. With a bag of this construction the use of an extraneous force, such as a spring or weight, to collapse the bag against the gas pressure and to open the feed valve, is avoided.

It is obvious that the lower wall of the outer cup of the gas bag may be dispensed with, if desired, and only the one self-collapsing cup or wall employed. In this case, of course, the holder must be completed by a suitable wall which would correspond to the outer lower walls or cup of the holder 17.

If desired, the outer side of the upper portion of the gas holder may be reinforced by applying thereto, in any suitable manner a stout fabric 21, such as canvas, to add strength and stiffness thereto without increasing its bulk to any appreciable extent. It is, of course, obvious that the gas holder may be made of other material than rubber if desired, and that other material than fabric may be employed for reinforcing the upper portion thereof to secure the desired strength and resilience.

The gas bag is provided at the center of its lower wall with an orifice in register and communication with the tubular extension 16. Said lower wall is clamped to the partition wall by a hollow screw plug 18 which is formed with a radial clamping flange at its upper end and extends down through the central aperture of the bag and the partition and is threaded into a clamping ring 19 rigidly secured within the upper end of the tubular housing. The upper surface of this ring bears against the under side of the bottom wall of the cup-shaped partition. It will thus be seen that the screw plug 18 not only secures the rubber bag within the cup-shaped partition, but also clamps the tubular housing against the under side of said partition. The stem 20 of the feed plunger extends axially through the upper side of the gas holder and is rigidly secured to the upper wall of the said holder by means of suitable clamping washers and nuts, the upper end of said stem being threaded for this purpose.

The feed valve will be depressed or lowered when the carbid supply is exhausted from the carbid holder thereby leaving the feed aperture open so that when the said holder is detached and inverted, it may be recharged through the feed opening without the necessity of any manual opening of the valve or the removal of any parts. This, as will be readily appreciated, is of great advantage and avoids any danger of losing and misplacing parts or damaging them by repeated or careless manipulation thereof.

The chamber or support 3 is preferably made to hold one half of a charge of carbid for the carbid holder, so that it may be used as a convenient measure for gaging the charge of carbid. When filling the carbid holder the valve is first closed and the chamber filled with carbid. The valve is then opened to permit the carbid to flow into the carbid holder; the valve is then again closed and the chamber 3 again filled, and this second charge permitted to flow into the carbid holder by opening the feed valve. By this means there will be no difficulty in securing the proper amount of carbid in the carbid holder, and the annoyance caused by pouring too much carbid therein is avoided.

The tubular housing, 16 is perforated and over these perforations is secured a filter 26 the gas in the carbid holder passing through the filter into the housing 16, and thence into the gas holder.

To the upper edge of the cup shaped receptacle is secured a reducing valve or governor 27, through which the gas passes on its way to the burner, a flexible pipe 28 connecting the flexible gas holder with the governor. A horizontal rod 29 is threaded through the lower part of the casing of the governor valve, its outer end carrying a suitable button and its inner end engaging the upward extending arm of a pivoted bell crank lever 30. The lower arm of this bell crank lever engages under a cross bar 31, which is secured to the top wall of the expansible gas holder. It is obvious that by screwing inward the rod 30 the gas holder will be expanded and the feed plunger raised and locked in position until the rod is unscrewed.

As shown in Figs. 1 and 2 the feed valve or plunger is provided with a single cylindric closure or stop at its lower end which acts to seal the feed passage when the gas holder is inflated. In Figs. 4 and 5 however, the plunger is provided with an additional upper stop or closure 6ᵃ which is adapted to close the feed passage and seal the same when the gas holder is entirely collapsed. When this form of valve is used, I prefer to use a valve operating mechanism by which the feed plunger may be manually positioned to bring the stops equal distances on each side of the feed aperture. In this way when the carbid is poured into the inverted filling funnel 10 it will pass through the feed opening around the two stops or closures 6 and 6ᵃ. To quickly adjust the feed valve to this midway position I secure to the valve operating rod 29ᵃ a cam 35 which on one side is provided with a continuous face 35ᵃ and on its other side with a shoulder or stepped face 35ᵇ. This cam bears against a lug 36 formed on the reducing valve casing and moves the rod 29ᵃ longitudinally, thereby actuating the lever 30ᵃ and raising the feed plunger. By rotating the rod 29ᵃ in the direction to cause the continuous cam surface 35ᵃ to bear on the lug 36, the valve will be completely raised and the lower stop or plunger brought into position to seal the feed opening. By rotating the cam in the opposite direction to bring the shouldered face 35ᵇ thereof to operate on the lug 36 as shown in Figs. 5 and 6, the valve will be raised or lowered, as the case may be, half way, the shoulder of the cam contacting with the lug 36 and limiting the movement of the cam in that direction.

Having thus described my invention, what I claim as new and desire to secure by Letters Patent, is:—

1. An acetylene generator comprising a liquid receptacle, a detachable carbid holder formed with a feed aperture in its bottom and being otherwise hermetically sealed except for the gas outlet, a filling tube or funnel below the feed aperture and serving when the carbid holder is detached and inverted to direct the carbid into the holder through the aperture, a feed valve and means for moving said valve away from the feed opening to permit the carbid holder to be charged through the feed aperture.

2. An acetylene generator comprising a liquid receptacle, a detachable carbid holder formed with a feed aperture in its bottom and being otherwise hermetically sealed except for the gas outlet, a filling tube or funnel below the feed aperture and serving when the carbid holder is detached and inverted to direct the carbid into the holder through the aperture, a feed valve and means for automatically moving said valve away from the feed opening when the carbid holder is empty, to permit the carbid holder to be charged through the feed aperture.

3. In an acetylene generator, a liquid receptacle, a detachable carbid holder formed with a feed aperture in its bottom, said carbid holder being otherwise hermetically sealed whereby access to its interior may be had only through the feed aperture, a feed valve, and means for holding said feed valve open, whereby when the carbid holder is detached it may be inverted and charged through the feed aperture.

4. In an acetylene generator, a liquid receptacle, a detachable carbid holder formed with a feed aperture in its bottom, said carbid holder being otherwise hermetically sealed whereby access to its interior may be had only through the feed aperture, a feed valve, and means for normally holding said valve open when the carbid is exhausted from the carbid holder, whereby when the carbid holder is detached it may be inverted and charged through the feed aperture.

5. An acetylene gas generator comprising a liquid holder, a carbid holder detachably secured thereto and provided with a feed aperture in its bottom, a feed valve, a self-collapsing flexible gas holder wall, means connecting the feed valve to said movable wall, whereby the said valve will be depressed when the gas pressure is reduced, and manual means for moving the gas holder wall and closing the valve.

6. An acetylene generator comprising a liquid holder, a detachable carbid holder having a feed aperture in its bottom, a feed valve therefor, a self-collapsing flexible gas holder, means connecting the valve to the movable wall of said holder whereby when the gas pressure is reduced the valve will be opened, and manual means for expanding the gas holder and closing the valve.

7. An acetylene gas generator comprising a liquid holder, a detachable carbid holder provided with a feed aperture in its bottom and being otherwise hermetically sealed except for the gas outlet whereby access can be had to the interior of said holder only through said feed aperture, a filler funnel below the feed aperture and having one of its ends registering therewith, a valve for said aperture and means for normally holding said valve open when the carbid holder is empty, whereby the carbid holder may be detached and inverted and recharged through the feed opening.

8. An acetylene gas generator comprising a water holder, a detachable carbid holder provided with a feed aperture in its bottom and being otherwise sealed whereby access may be had to its interior only through said feed aperture, a self-collapsing flexible gas bag in the carbid holder, a feed plunger, a valve stem connecting said plunger to the movable wall of the gas bag whereby when the gas pressure is reduced the valve will be lowered, and a downwardly enlarging funnel having its smaller end registering with the feed aperture whereby when the carbid is exhausted the carbid holder may be detached and inverted and recharged through the feed aperture, and manual means for expanding the gas bag and closing the feed aperture.

9. An acetylene generator comprising a water holder, a detachable carbid holder provided with a feed aperture in its bottom, a flexible valve ring surrounding said feed aperture, a valve working through said valve ring and hermetically sealing the passage, the carbid hopper and water holder being otherwise hermetically sealed whereby the gas generated will pass upward through the feed aperture and the carbid holder may be recharged through said aperture when the holder is detached and inverted, and a funnel having one of its ends registering with said feed aperture and directing the carbid thereto during the filling operation.

10. An acetylene generator comprising a liquid receptacle, a detachable carbid holder formed with a feed aperture in its bottom, said holder being otherwise sealed whereby access to its interior may be had only through the feed aperture, a feed valve working vertically through said feed aperture, means for moving said valve vertically away from the feed opening whereby when the carbid holder is detached it may be inverted and charged through the feed aperture.

11. An acetylene generator comprising a liquid receptacle, a detachable carbid holder formed with a feed aperture in its bottom, said holder being otherwise sealed whereby access to its interior may be had only through the feed aperture, a feed valve working vertically through said feed aperture, means for moving said valve below the feed opening whereby when the carbid holder is detached it may be inverted and charged through the feed aperture.

12. An acetylene generator comprising a water holder, a carbid holder detachably secured thereto and formed with a feed aperture in its bottom and being otherwise sealed except for the gas outlet, an intermediate chamber or filler-cup secured to the carbid holder around the feed aperture, means to connect the lower end of said chamber to the top of the water holder, a downward enlarging funnel having its smaller end registering with the said feed opening, a valve working vertically through said feed aperture, means for normally lowering said valve below the feed aperture and into the filler cup whereby when the carbid holder is emptied the said aperture will be open and the carbid holder may be detached and inverted and recharged through the feed aperture, and manual means for shifting the valve to close the feed aperture.

13. An acetylene gas generator comprising a liquid receptacle, a detachable carbid holder formed with a feed aperture in its bottom, said carbid holder being otherwise hermetically sealed whereby access may be had to its interior only through said feed opening, a valve ring secured in said feed aperture, a rigid filling tube or funnel below the feed aperture and having its contracted end in register with the opening through the valve ring and serving when the carbid holder is detached and inverted to direct the carbid into the holder through the valve ring, a valve working through said feed aperture, and means for moving said valve away from the feed opening to permit the carbid holder to be charged through the feed aperture.

14. An acetylene gas generator comprising a liquid receptacle, a carbid holder provided with a contracted depending support extending below the bottom of the said holder and formed with a feed aperture in its bottom, a downward enlarging filling funnel in the contracted support and having its smaller end registering with the feed aperture, its lower enlarged end fitting closely against the interior of the contracted support and serving when the carbid holder is detached and inverted to direct the carbid into the holder through the feed aperture, a valve for closing said feed aperture, means for moving said valve away from the feed aperture, and means for detachably connecting the lower end of the contracted support to the water holder.

15. An acetylene gas generator comprising a carbid holder formed with a feed aperture in its bottom, a water holder with an opening in its top, an intermediate part carried by the carbid holder and surrounding the feed aperture, means for detachably connecting the lower end of this intermediate part to the water holder around the opening therein, a feed valve adapted to close the feed aperture, and means whereby the carbid holder may be charged through the intermediate part when the carbid holder is detached from the water holder and inverted.

16. An acetylene gas generator comprising a carbid holder formed with a feed aperture in its bottom, a water holder formed with an opening in its top, an intermediate part carried by the carbid holder and surrounding the feed aperture, said carbid holder being hermetically sealed outside of said intermediate part except for the gas outlet to the burner whereby access to the interior of said carbid holder must be had through said intermediate part, means for detachably connecting the lower end of this intermediate part to the water holder around the opening therein, a feed valve adapted to close the feed aperture whereby the carbid holder may be charged through the intermediate part when the carbid holder is detached from the water holder and inverted.

17. An acetylene gas generator comprising a carbid holder formed with a feed aperture, a feed valve adapted to close said aperture, means for automatically actuating said feed valve, a water holder formed with an opening, means for detachably connecting the carbid holder to the water holder to hermetically seal said opening, the carbid holder being also hermetically sealed above the connection with the water holder except as to the gas outlet so that access to its interior can be had only by disconnecting it from the water holder, whereby said carbid holder can be recharged only by disconnecting it from said water holder.

18. An acetylene gas generator comprising a carbid holder formed with a single feed and charging aperture, a feed valve to control said aperture, means for actuating said feed valve, a water holder formed with an opening, means for detachably connecting the carbid holder to the water holder in such position as to place the feed aperture of the carbid holder in communication with the opening in the water holder and to thereby seal both the water holder and carbid holder except as said parts may be in communication with each other, whereby said carbid holder can be recharged only by disconnecting it from the water holder.

19. An acetylene gas generator comprising a carbid holder, a water holder, means for detachably connecting together said parts, and means whereby the carbid holder can be recharged only when it is disconnected from said water holder, whereby it will be impossible to recharge said carbid holder during the operation of generating gas.

20. An acetylene gas generator comprising a carbid holder formed with a feed aperture, a feed valve adapted to close said aperture, means for automatically actuating said feed valve, a water holder formed with an opening, means for detachably connecting the carbid holder to the water holder to seal said opening, the carbid holder being sealed against access to its interior above the connection with the water holder, whereby said carbid holder can be recharged only by disconnecting it from said water holder.

21. A carbid feed acetylene gas generator comprising an upper carbid holder, a lower water holder, means for detachably connecting together said holders, the carbid holder being sealed against access to its interior when the two holders are connected together and having a charging opening accessible only when the two holders are separated from each other, whereby it will be impossible to recharge said carbid holder when the two holders are connected together.

Signed at New York, N. Y., this 28th day of October, 1907.

CHARLES W. BECK.

In the presence of—
WM. R. DAVIS,
EMMA H. H. KAUFMANN.